Aug. 28, 1962
C. F. WEST ETAL
3,051,285
ONE-REVOLUTION CLUTCH AND STOP MEANS
Original Filed Jan. 22, 1957
2 Sheets-Sheet 1
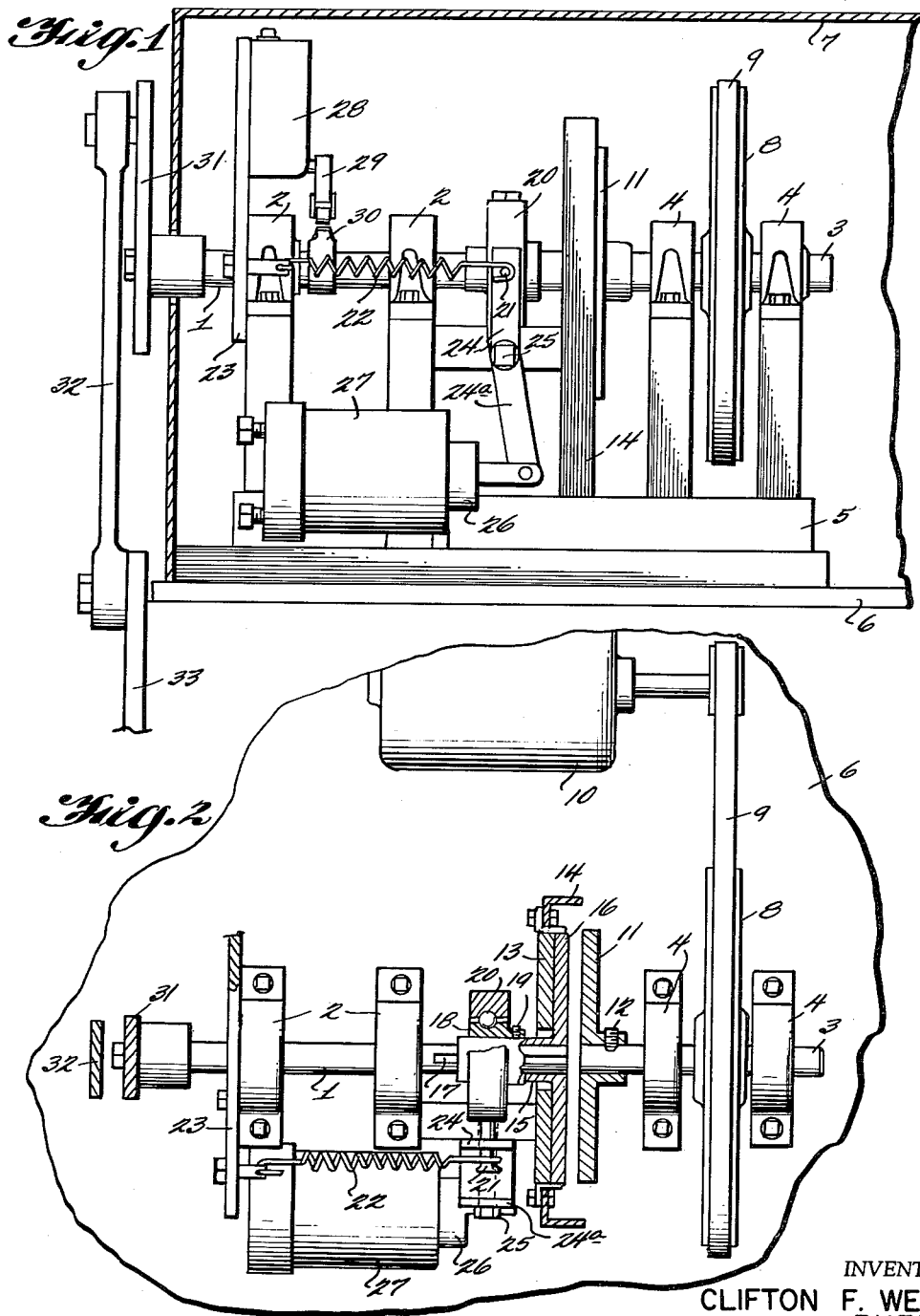
INVENTORS
CLIFTON F. WEST
WILLIAM F. RHEM
JESSE B. WETHINGTON
BY J. Hanson Boyden,
ATTORNEY Aug. 28, 1962 C. F. WEST ET AL 3,051,285
ONE-REVOLUTION CLUTCH AND STOP MEANS
Original Filed Jan. 22, 1957
2 Sheets-Sheet 2
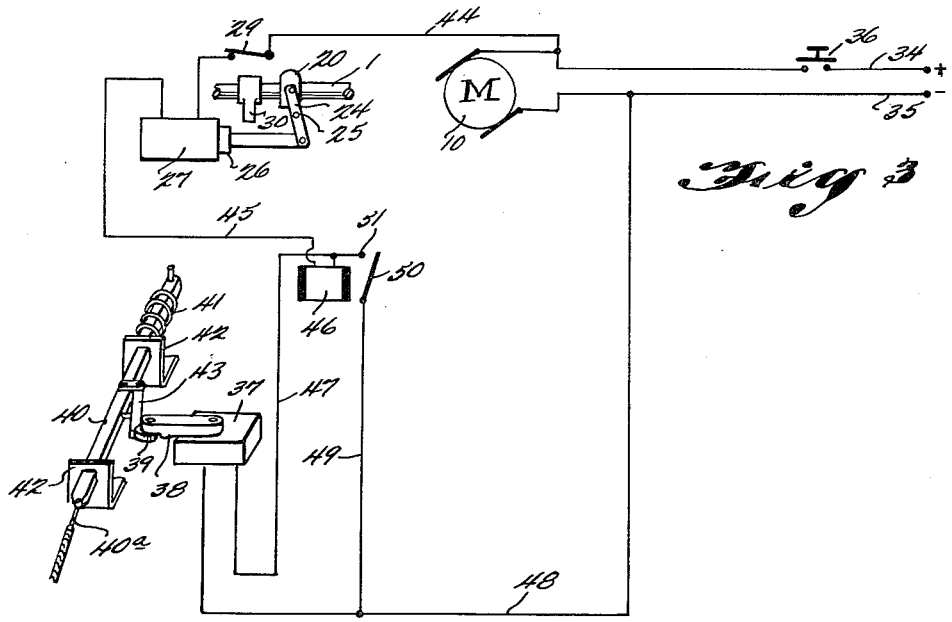
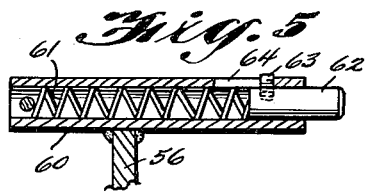
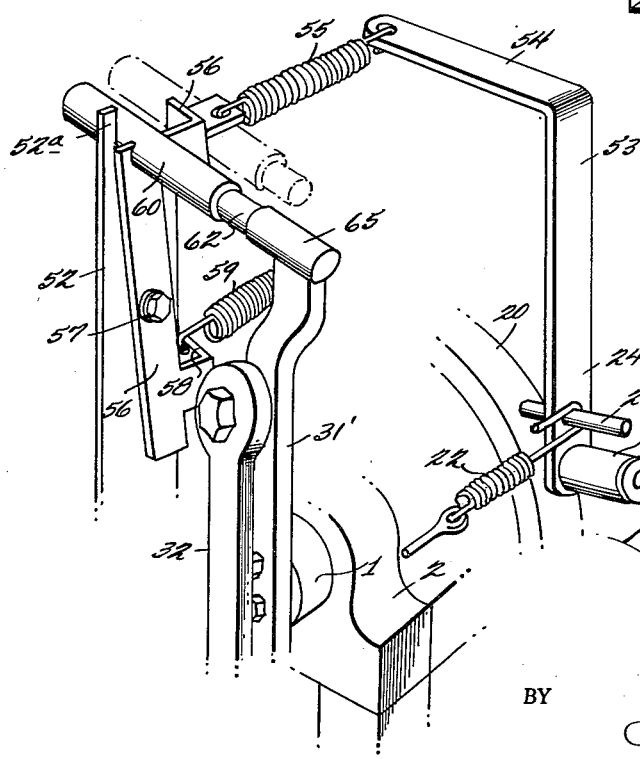
INVENTORS
CLIFTON F. WEST
WILLIAM F. RHEM
JESSE B. WETHINGTON
BY J. Hanson Boyden,
ATTORNEY United States Patent Office 3,051,285
Patented Aug. 28, 1962

3,051,285
ONE-REVOLUTION CLUTCH AND STOP MEANS
Clifton F. West, Jesse B. Wethington, and
William F. Rhem, Kinston, N.C.
Original application Jan. 22, 1957, Ser. No. 635,481, now Patent No. 2,876,610, dated Mar. 10, 1959. Divided and this application Jan. 8, 1959, Ser. No. 785,735
2 Claims. (Cl. 192—148)

This invention relates to automatic mechanisms, and more particularly to that type of mechanism commonly known as a one-revolution clutch.

Devices of this nature are intended to be interposed between a driving member and a driven shaft, and are so designed that, after each actuation of the clutch to render it operative to transmit power from the driving member to the driven shaft, the clutch is automatically disconnected when such shaft has made one complete revolution.

The present application is a division of our prior copending application Serial Number 635,481, filed January 22, 1957, now Patent No. 2,876,610, granted March 10, 1959.

One object of the invention is to provide electrically operated means for controlling the clutch, such means being so designed that the actuation of the clutch to transmit power is effected by the momentary closing of a circuit.

A further object is to provide means whereby the operating circuit, having once been closed, is maintained closed until opened by the movement of the driven shaft.

Still another and important object of the invention is to devise means whereby the driven shaft, upon each operation, is arrested accurately after one revolution, in the precise position from which it started.

With the above and other objects in view, and to improve generally on the operation of such devices, the invention consists in the construction and combination of parts hereinafter described and claimed, and illustrated in the accompanying drawings, forming part of this specification, and in which:

FIG. 1 is a side elevation of one form of our improved mechanism;

FIG. 2 is a sectional plan thereof, some parts being broken away, and other parts being omitted;

FIG. 3 is a diagram of the circuits and control means employed;

FIG. 4 is a fragmentary perspective view showing a modified form of our improved mechanism, parts being omitted for the sake of clearness; and FIG. 5 is a detailed longitudinal section on an enlarged scale through one of the parts shown in FIG. 4.

Referring to the drawings in detail, and more particularly first to FIGS. 1, 2 and 3 thereof, our improved mechanism comprises a shaft 1 mounted in bearings 2. In line with the shaft 1 is a second shaft 3 supported in bearings 4, these bearings 2 and 4 resting on a base 5 which in turn is carried by a platform 6 supported in any suitable way. Secured to the shaft 3 between the bearings 4 is a pulley 8 driven by a belt 9 from an electric motor 10. The whole mechanism is enclosed in a housing 7.

Secured to the inner end of the shaft 3 is a clutch disc 11, which may be held to the shaft as by means of a set screw 12. Parallel with and spaced from the clutch disc 11 is a stationary brake disc 13 supported by means of an angle iron frame 14. This brake disc has an opening in its center, and through this opening passes a sleeve 15, having at its free end a disc 16 disposed between the two discs 11 and 13 and adapted to engage alternately with both of them. The sleeve 15 is slidably mounted on the shaft 1 as by means of a key 17. Surrounding the sleeve 15 is any suitable type of a combined rotary and thrust bearing comprising an inner race 18 secured to the sleeve as by means of a set screw 19, and an outer race 20. Radially projecting from this outer race 20 is a pin 21 to which is secured one end of a spring 22, the other end of this spring being anchored to a fixed support 23, preferably carried by the bearing 2.

Pivotally connected with the pin 21 is the upper end of a lever 24 pivoted near its lower end at 25 to a fixed support. Rigid with the lever 24 is another lever 24a, pivotally mounted on the same pin 25 and connected at its lower end to the core 26 of a solenoid 27.

A switch box 28 is secured to the fixed support 23 and contains a switch operated by arm 29, which may be of any suitable type. This arm is adapted to be engaged and actuated by a cam 30 secured to the shaft 1.

In the diagram, FIG. 3, the wires leading to the source of supply are shown at 34 and 35. In one or both of these wires is inserted a manual switch 36 for controlling the motor. The motor 10 is shown as connected across the wires 34 and 35.

A switch 37 which is mounted at any convenient place is provided with an actuating arm 38, preferably having a roller 39 at the end thereof. A Bowden wire 40a, extending from any suitable operating device, is connected with a bar 40 slidably mounted in brackets 42 and having at one end a coil spring 41 which holds the bar at its extreme position. Pivotally mounted on the bar 40 is a finger 43 adapted to engage the roller 39 and swing the arm 38 on its pivot in such a manner as to close the switch. A conductor 44 connects the positive wire 34 with the switch in box 28 operated by arm 29, and from this switch extends a conductor to one side of the solenoid 27. From the other side of this solenoid extends a wire 45 to one side of a relay 46, and from the other side of this relay extends a wire 47 to one side of the switch 37, the other side of which is connected by conductor 48 to the negative wire 35. The relay has an armature 50, connected to the wire 48 by means of a conductor 49, and the armature is adapted to engage a contact 51 connected with one side of the relay winding and with the wire 47.

The operation of the mechanism, as so far described, is as follows.

When a pull is exerted on the Bowden wire 40a, this in turn will cause the bar 40 (FIG. 3) to slide forwardly and thus cause the finger 43 to engage and swing the switch arm 38 on its pivot. This closes the switch 37 and the relay 46 will thus be energized over the wires 45, 47 and 48. This moves the armature 50 into engagement with the contact 51, thus establishing a shunt around the switch 37, and maintaining the relay 46 energized through the conductor 49. Current then flows from the main 34 through wire 44, switch 29, solenoid 27, wire 45, relay 46, contact 51, armature 50, and wires 49 and 48, thus energizing the solenoid 27.

Meanwhile, the motor 10, shown in FIG. 2, drives the wheel 8 continuously, so that the clutch disc 11 is constantly driven. Energization of the solenoid 27 causes it to draw in it core 26 and swing the lever 24, 24a, on its pivot. This, acting through the bearing 20, moves the sleeve 15 and disc 16 toward the right, as viewed in FIG. 2 into frictional engagement with the clutch disc 11. The disc 16 which is keyed to the shaft 1 thus begins to turn. Assuming, by way of example, that the one-revolution clutch mechanism is employed to produce a single stroke of some reciprocating element, a crank arm 31 is rigidly secured to the end of shaft 1, and a connecting rod 32 joins this crank with a bar 33 connected with the reciprocating element. The normal position of the crank 31 is as shown in FIG. 1 so that when the shaft 1 turns, this crank moves in such a manner as to thrust the connecting rod 32 and bar 33 suddenly downwardly.

The shaft 1 and crank 31 continue to revolve so that as soon as the reciprocating element has made its downward stroke, as before described, it is immediately moved upwardly again to its original starting point. In other words, the crank 31 at each actuation of the solenoid makes one complete revolution. As it reaches its original position the cam 30 on the shaft 1 trips the switch arm 29 and thus breaks the circuit of solenoid 27. When the solenoid is thus de-energized the spring 22 draws the disc 16 back into engagement with the fixed braking disc 13, thus stopping the shaft 1 in a position at which the crank 31 is at the top of its movement, as shown in FIG. 1.

The mechanism above described thus constitutes a one-revolution clutch controlled by the solenoid 27 and interposed between the constantly running motor 10 and the crank 31, so that, upon one energization of the solenoid, the crank makes one complete revolution and then stops, with all of the associated parts in their original position.

The arrangement of the switch and relay shown in FIG. 3 is important. When the bar 40 slides forwardly, the finger 43 swings the switch arm 38, and immediately the finger slips off of the roller 39, thus releasing the switch arm. The momentary closing of the switch 37 energizes the relay 46 which thereupon maintains its own circuit and the circuit through the solenoid 27 until the switch 29 is tripped open by the cam 30 as above described. Thus it is immaterial how long the pull on the Bowden wire is maintained. The pull on this wire merely causes a momentary closure of the switch 37, which then snaps back to its original open position. By virtue of this arrangement, it will be seen that even if the pull on the Bowden wire should be maintained indefinitely no harm would be done, since the reciprocating element would make a single stroke only and then stop.

Although the mechanism above described is theoretically operative accurately, we have found in practice that there is a tendency for the disc 16, due to its momentum, to slip a little on the fixed braking disc 13, and that this braking disc sometimes fails to stop the disc 16 exactly in the desired position. To overcome this, we have devised positive stop means for absolutely preventing any possible overrunning of the disc 16 and shaft 1.

As best shown in FIG. 4, the solenoid operates a crank arm 24ª pivoted at 25 to a fixed support 25ª and rigidly connected with a lever 24, extended upwardly as at 53, and bent over to form an arm 54. A pin 21 is set into the lever 24 and also into the thrust bearing 20, as before, and a spring 22 is secured at one end of the pin 21 and at the other end to a fixed support.

At its free end the arm 54 is connected with one end of a spring 55, the other end of which is attached to a lug secured to a lever 56 pivoted at 57 to a fixed support 52. Near the opposite end of this lever is another lug 58 to which one end of a third spring 59 is attached, the other end of the spring 59 being secured to a fixed support. Secured, as by welding, to the upper end of the lever 56 is a cylinder 60 in which is enclosed a compression spring 61, and, in the end of the cylinder is slidably mounted a plunger 62, the same being secured by means of a screw 63 passing through a slot 64. Thus the plunger 62 is resiliently supported and urged outwardly by the spring 61.

When in the full line position shown in FIG. 4, the plunger 62 registers with and is arranged to engage an abutment 65 carried at the upper end of a crank arm 31', secured to shaft 1. When the solenoid 27 is energized and the lever 24, 54 swung on its pivot, the clutch is engaged as in FIGS. 1 and 2, and the shaft 1 is driven.

At the same instant, the lever 24, 54, acting through the spring 55, swings the lever 56 to the right as viewed in FIG. 4, thus shifting the cylinder 60 and plunger 62 into the position shown in dotted lines in FIG. 4, in which position it is out of line with the abutment 65. This leaves this abutment and the crank arm 31' free to turn, and the crank arm begins to revolve. When the cam 30 actuates the switch arm 29 to operate the switch 28 and de-energizes the solenoid, as before described, the spring 22, which is stronger than the spring 55, moves the angle lever 24, 54 so as to relax tension on the spring 55. At the same time, the spring 59 swings the lever 56 about its pivot back to full line position where it is stopped by the projection 52ª, and where the plunger 62 is in the path of movement of the abutment 65. This abutment therefore impinges against the plunger 62 which constitutes a positive stop element for arresting the crank arm in the exact position from which it started. Thus, our improved mechanism provides means for accurately arresting the movement of the crank arm in identically the same position after it has made each single revolution.

What we claim is:
1. A clutch mechanism comprising a driving shaft, a driven shaft having a crank arm fixed thereto, a connecting rod pivotally secured to said crank arm inter-engaging clutch elements positively secured to said driving and driven shafts, a stop element normally lying in the plane of revolution of said crank arm, mechanically interconnected means for bringing said clutch elements into engagement and for simultaneously shifting said stop element to a position out of the plane of revolution of said crank arm, whereby the latter is free to rotate, and automatic means brought into operation by said driven shaft as it completes on revolution, for disengaging said clutch elements and simultanteously restoring said stop element to its normal position in which said crank arm impinges against it and is arrested.

2. A clutch mechanism comprising a driving shaft, a driven shaft having a crank arm fixed thereto, inter-engaging clutch elements positively secured to said driving and driven shafts, a stop element normally lying in the path of rotary movement of said crank arm, a single electromagnetically operated means for bringing said clutch elements into engagement and for simultaneously shifting said stop element to a position out of the path of movement of said crank arm, means in addition to said crank arm for maintaining said stop element in such position while said crank arm revolves, means brought into action by said driven shaft as it completes one revolution for de-energizing said electromagnetic means, and spring means operating upon the de-energization of said electromagnetic means for disengaging said clutch elements and simultaneously restoring said stop element to its normal position, so that said crank arm impinges against it and is arrested in a definite position.

References Cited in the file of this patent
UNITED STATES PATENTS

| | | |
|---|---|---|
| 1,548,440 | Boyd et al. | Aug. 4, 1925 |
| 1,687,587 | Pearne et al. | Oct. 16, 1928 |
| 1,815,152 | Klotz | July 21, 1931 |
| 2,065,820 | Mellon | Dec. 29, 1936 |
| 2,234,909 | Arey et al. | Mar. 11, 1941 |
| 2,860,748 | Turner et al. | Nov. 18, 1958 |